Patented July 9, 1940

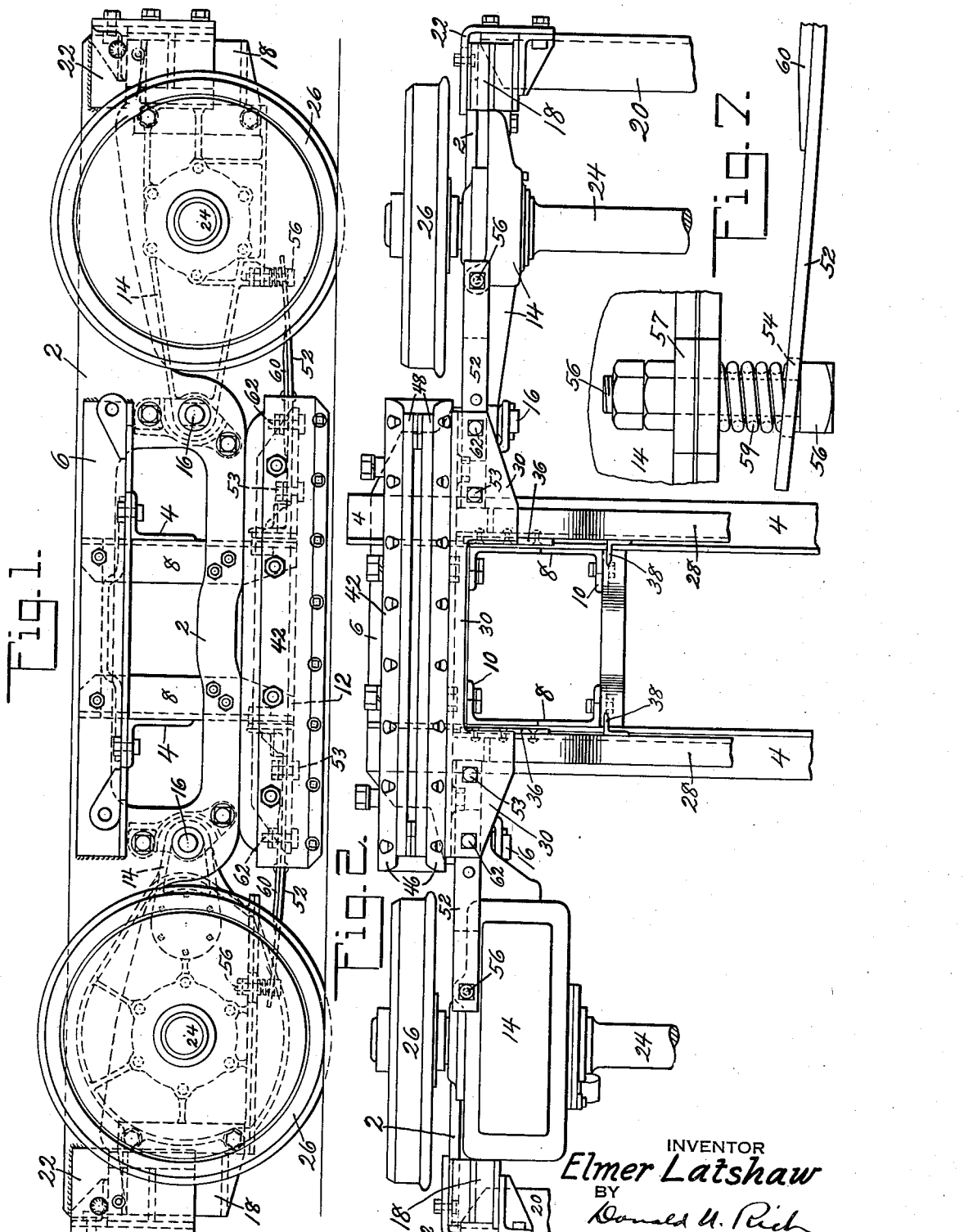

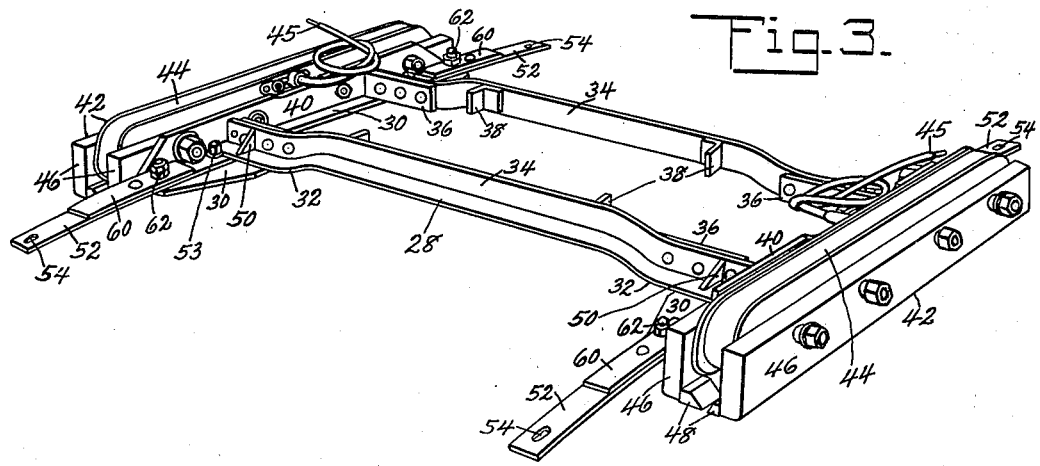
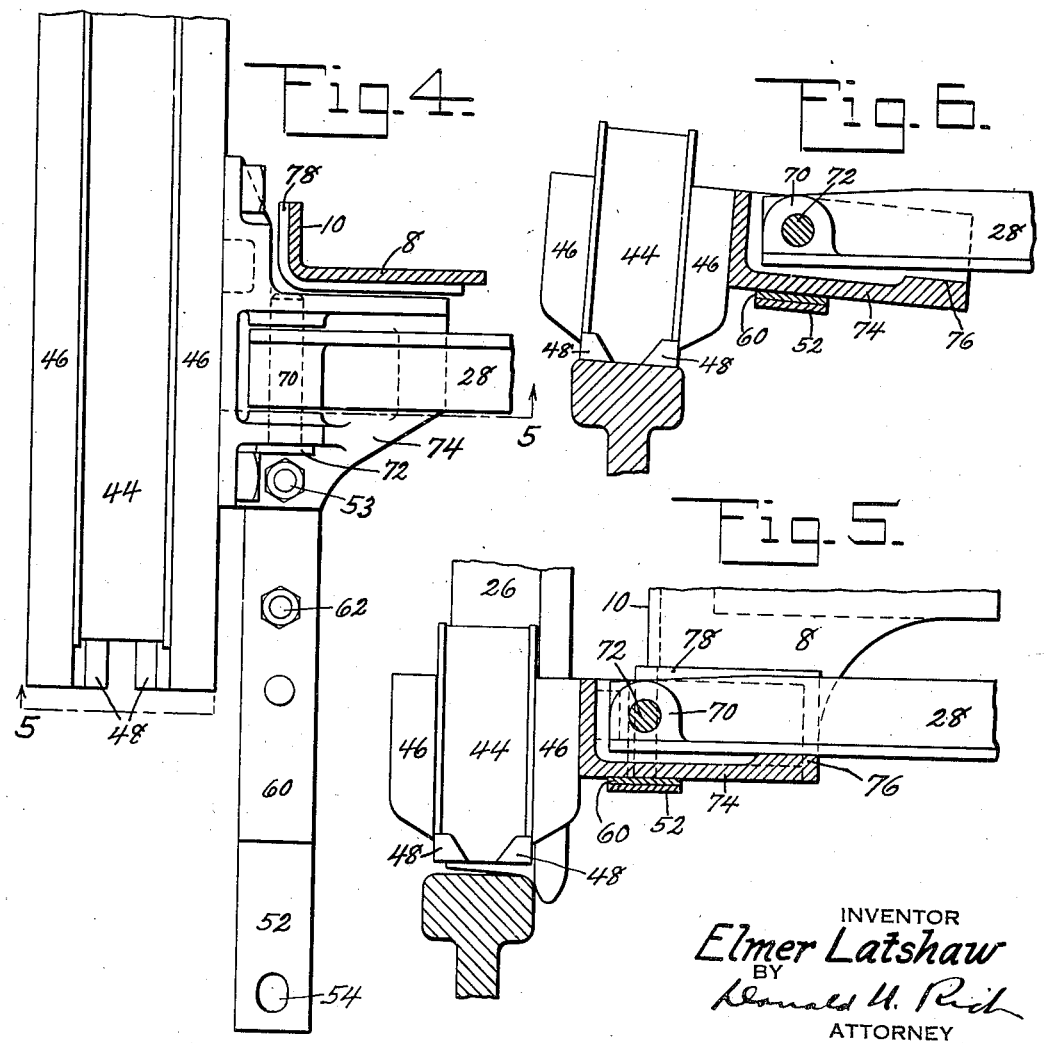

2,207,295

UNITED STATES PATENT OFFICE 2,207,295

RAIL BRAKE FOR RAILWAY CARS

Elmer Latshaw, Philadelphia, Pa., assignor to The J. G. Brill Company, Philadelphia, Pa., a corporation of Pennsylvania Application December 8, 1938, Serial No. 244,663

17 Claims. (Cl. 188—165)

This invention relates to rail brakes in general and in particular to rail brakes applied to trucks of electrically propelled cars running on street railways and requiring high braking rates.

In the past rail brakes have been provided suspended from elements of the truck frame by spring or other means located anywhere from the ends of the rail brake. With these arrangements, however, the brakes lacked stability and were extremely noisy in service and unsatisfactory in a number of instances due to their excessive movement relative to the rail. It is an object, therefore, of the present invention to provide a truck having a rail brake in which the brake heads are carried by resilient suspensions connected to truck elements at widely spaced points to increase the stability of the brake.

Another object of the invention is the provision of a truck having a rail brake connected by suitable means to the axle bearings adjacent the axles in order to eliminate, as much as possible, undesirable movements of the brake.

A further object of the invention is the provision of a truck provided with a rail brake and in which the brake heads may pivot, thus insuring perfect rail head contact even though the rails be badly worn or beveled.

These and other objects of the invention will be apparent to persons skilled in the art from a study of the following description and accompanying drawings, in which:

Figure 1 is a side elevation of the truck and rail brake;

Fig. 2 is an inverted plan view of substantially one-half the truck with the brake applied thereto;

Fig. 3 is a perspective view showing the rail brake unit as assembled ready for application to the truck;

Fig. 4 is a plan view showing a portion of the rail brake and discloses a modification thereof;

Fig. 5 is a sectional view taken substantially on line 5—5 of Fig. 4 and showing the brake in its normal released position;

Fig. 6 is a sectional view similar to Fig. 5 but showing the modified brake applied to the rail, and Fig. 7 is an enlarged view showing the connection between the brake unit and truck element.

Referring now to the drawings in detail, it will be seen that the truck is formed of plate-like side frames 2 spaced apart and connected by means of central cross ties 4 through the medium of angle members 6 welded to the outer side of the frame. The central cross ties are also connected to the side frames and braced by pairs of channel bolster guides and supports 8 having their flanges 10 directed toward each other and secured to the adjacent truck parts. These bolster guide and support channels are extended downwardly below the lower portion of the side frames as at 12 (Fig. 1) in order to provide guide surfaces for a purpose later to be described. The side frames are of the pedestal-less type and are mounted upon the axles by means of axle control arms or bearing members 14 pivoted at one end as at 16 to the truck side frame, the opposite end being connected to the truck side frames by means of rubber or other resilient shear units 18. These rubber shear units are formed in any desired manner, usually by connecting two metal plates by vulcanizing rubber thereto, and which plates are in turn connected, one to the truck frame, the other to the bearing member or control arm. The side frames are connected at their ends by end cross ties 20 joined to angle members 22 welded or otherwise secured to the truck frame and forming pockets and supports for the rubber or other elastic shear units previously referred to. The bearing members or control arms are supported upon axles 24 which in turn are supported by spaced wheels 26, preferably of the elastic or shock absorbing type. The truck, of course, is provided with a customary bolster (not shown), which will be supported by any suitable means, such as rubber shear units (not shown), connecting the bolster and bolster guide or support channels 8. A further and more complete description of the truck itself may be found in my co-pending application directed to a lightweight truck, Serial No. 244,662, filed December 8, 1938, but since the truck itself forms no part of the present invention further showing or description thereof will not be given here.

The rail brake unit is formed by a pair of angle members 28 connected together at their ends by short end angles 30 (Fig. 3) by any suitable means, such as welding or riveting. The angles 28 have their ends offset as at 32 in order to give additional clearance at the center of the truck. The angles are positioned with one leg 34 directed upwardly and to this upwardly directed leg at its ends are attached wear plates 36 as well as stops 38 of angular form. It will be seen that these angle members form a skeleton framework adapted to slide vertically upon the extensions of the channel-like bolster guides 8, with the wear plates 36 contacting the webs and the stops 38 contacting the inner flanges thereof. It will thus be seen that the framework is free to slide vertically along the guide extensions with the wear plates counteracting the longitudinal thrusts, while the stops will check any lateral movement of the framework. The end angles of this framework are positioned with one leg 40 directed vertically and to the outer side thereof is bolted a magnet assembly 42. In the present instance this magnet assembly consists of magnets 44 adapted to be supplied with current through leads 45, thus magnetizing bars 46 carried at the sides of the magnet and provided at their lower edges with inturned portions 48 suitably spaced from each other and adapted to be pulled into contact with the rail when the magnet is energized. With the magnets energized the surfaces 48 will be pulled into contact with the rail head completing the magnetic circuit and applying a powerful braking effort frictionally resisting any movement of the magnets longitudinally of the rails. In order to suitably brace angles 28 and assist in transferring the braking effort to the bolster guides, small gussets 50 are welded in place adjacent the wear plates and inward from the end connecting angles.

The framework and attached brake heads are resiliently suspended from the truck by means of semi-elliptic springs, each including an element 52 having one end thereof anchored as at 53 to the horizontal flange of the adjacent end connecting angle, while the free ends thereof are slotted as at 54 to receive and rest upon the head of bolts 56 extending through lugs 57 formed or provided on the bearing or control arms 14 preferably adjacent the axles. The elongated slot in the spring element 52 permits the necessary movement and since said element is spaced from the control arm, it is found desirable to provide a coil or other spring means 59 in order to prevent rattling of the connection. The semi-elliptic springs also include resilient elements 60. Adjustment of the springs for resiliency and for clearance between the magnet and rail head is effected by means of a bolt or other means 62 extending through the spring and through the horizontal flange of the end connecting angle 30. It will be obvious that by tightening or loosening the adjusting bolt 62 the effective length of the spring will be changed, thus modifying its characteristics and at the same time changing the clearances between the rail head and brake. In other words, with the bolt 62 loose the spring is anchored at 53 but with bolt 62 drawn down tight the spring is clamped against flange 30 and in effect anchored at 62 and, therefore, its effective length is shortened. Any intermediate position of 62 will, of course, give a compound action of the spring, the degree of compounding being dependent upon the relative adjustment of bolt 62. It will also be apparent that clearance between the rail head and the brake element or magnet may also be varied by adjustment of bolt 56.

The operation of the brake just described is as follows, assuming the brake to be carried in its normal position clear of the rail head as shown in Figure 1: Upon application of current to the magnets the side plates will be magnetized and turned downwardly into contact with the rail head, such downward movement being permitted by the semi-elliptic springs and the slidable engagement between the framework and the channel bolster guide extensions. With the brake head held in contact upon the rail by a powerful magnetic force any sliding thereof will be frictionally resisted and this resisting force will be transferred through the rail plates and heavy bolster guides to the truck frame and car body. As soon as current is turned off from the magnets they will be deenergized and the springs will promptly lift the framework and attached magnets clear of the rail. In case the springs are found to be too resilient or the brake heads too close to the rail for normal operation, then tightening of the adjusting bolts 56 will raise the shoes to a greater distance above the rail head, and tightening of bolts 62 will make the spring elements 52, 60 less resilient while at the same time raising the shoes slightly.

Referring to the modified form shown in Figs. 4, 5 and 6, it will be seen that in general this modified brake is similar to that just described and may be used upon the truck without any changes thereof or without any changes in the spring suspension or brake head and accordingly wherever possible the same reference numerals previously used have been applied. In this form the transverse angles 28 are provided at their ends with bearing 70 adapted to receive a horizontally disposed pin 72 extending therethrough and through spaced bearings formed in a casting 74 bolted or otherwise secured to the rail brake side pieces 46. The casting 74 is extended inwardly from the pivot pin to provide a stop 76 adapted to contact with the horizontal leg of angle 28 in order that the magnet may be normally carried in a horizontal position as clearly shown in Fig. 5. In this form the spring anchoring bolt 53 extends through the casting, clamping the spring thereto and any longitudinal movement or braking reaction is transferred to the bolster guides by the casting bearing upon wear plates 78 secured to the bolster guides.

The operation of this modification will be exactly the same as that previously described with the exception that if the rail head is worn or excessively beveled, then as the framework and attached magnets move downward, the magnet assembly may pivot about pin 72 until such time as the brake faces 48 fully contact with the rail head. Pivoting of the magnet assemblies about the pin and into contact with the worn rail is clearly disclosed by Fig. 6, in which case the stop has rotated away from the angle 28. As soon as current is cut off from the magnets the assembly will be deenergized and the springs will lift the entire unit clear of the rail and into position as shown in Fig. 5.

While the brake has been described more or less in detail, it is obvious that various modifications and rearrangements of parts will be possible and all such modifications and rearrangements of parts are contemplated as will fall within the scope of the following claims.

What is claimed is:

1. In combination, a car truck having wheels and axles in spaced relationship, connected side frames, control arms carried by said axles, said control arms being pivoted at one end to the side frame and resiliently connected at the other end to the side frame for supporting said side frames, and a track brake unit carried by said control arms.

2. In combination, a car truck having wheels and axles in spaced relationship, connected side frames, control arms carried by said axles, said control arms being pivoted at one end to the side frame and resiliently connected at the other end to the side frame for supporting said side frames, and a track brake unit carried by said control arms by means of resilient members connected to said arms adjacent the axles.

3. In combination, a car truck having wheels and axles in spaced relationship, connected side frames, control arms carried by said axles and supporting said side frames, and a track brake unit carried by said control arms through the medium of semi-elliptic springs supported at their ends by said arms.

4. In combination, a car truck having wheels and axles in spaced relationship, connected side frames, control arms carried by said axles and supporting said side frames, and a track brake unit carried by said control arms through the medium of semi-elliptic springs supported at their ends by said arms, said support for the semi-elliptic springs being located adjacent the axle thereby maintaining substantially constant clearance between the rail and track brake unit.

5. In combination, a car truck having wheels and axles in spaced relationship, connected side frames, bearing means carried by said axles and supporting said side frames, said bearing means being pivotally connected to the side frames for rotational movement only and track brake mechanism carried by said bearing means between said pivotal connection and the adjacent axle.

6. In combination, a car truck having wheels and axles in spaced relationship, connected side frames, bearing means carried by said axles and supporting said side frames, and track brake mechanism carried by said bearing means through the medium of leaf springs attached at their ends to said bearing means.

7. In combination, a car truck having wheels and axles in spaced relationship, connected side frames, control arms carried by said axles and supporting said side frames, and a track brake unit carried by said control arms, said unit including pivotally mounted rail contacting heads.

8. In combination, a car truck having wheels and axles in spaced relationship, connected side frames, bearing means carried by said axles and supporting said side frames, and track brake mechanism connected to said bearing means, said mechanism including pivotally mounted rail contacting heads automatically adjustable to the rail head bevel.

9. In combination, a car truck having spaced apart wheels adapted to run on track rails, track brake mechanism located between the wheels and substantially in the plane thereof, and means connecting said truck and mechanism whereby the latter is normally supported clear of the rail, said means comprising semi-elliptic springs attached to the mechanism and having their free ends supported by the truck adjacent the axis of the wheels.

10. In combination, a car truck having spaced apart axles supported by wheels adapted to run on track rails, connected side frames, bearing means carried by said axles and supporting said side frames, bolster support and guide means secured to the side frames, said support and guide means including guide portions extending below the side frames, and track brake mechanism slidable vertically on said guide portions, said mechanism being normally supported by the truck in a position clear of the rails and independently of the said guide portions.

11. In combination, a car truck having spaced apart axles supported by wheels adapted to run on track rails, connected side frames, bearing means carried by said axles and supporting said side frames, bolster support and guide means secured to the side frames, said support and guide means including guide portions extending below the side frames, and track brake mechanism slidable vertically on said guide portions, said mechanism being carried by said bearing means through the medium of resilient members attached to said bearing means.

12. In combination, a car truck having spaced apart axles supported by wheels adapted to run on track rails, connected side frames, bearing means carried by said axles and supporting said side frames, bolster support and guide means secured to the side frames, said support and guide means including guide portions extending below the side frames, and track brake mechanism slidable vertically on side guide portions, said mechanism being normally carried clear of the rails by said bearing means through the medium of semi-elliptic springs attached to said mechanism and to said bearing means.

13. In combination, a car truck having spaced apart axles supported by wheels adapted to run on track rails, connected side frames, bearing means carried by said axles and supporting said side frames, bolster support and guide means secured to the side frames, said bolster support and guide means including channel form guide portions extending below the side frames, a framework slidable vertically along said channel form guide portions, resilient means connecting said truck and framework whereby the latter is resiliently supported and rail contacting brake heads carried by said framework above the rails.

14. In combination, a car truck having spaced apart axles supported by wheels adapted to run on track rails, connected side frames, bearing means carried by said axles and supporting said side frames, bolster support and guide means secured to the side frames, said bolster support and guide means including channel form guide portions extending below the side frames, a framework slidable vertically along said channel form guide portions, resilient means connecting said truck and framework whereby the latter is resiliently supported and rail contacting brake heads carried by said framework above the rails, said rail contacting heads being movably connected to said framework and automatically adjustable to the rail head bevel.

15. In combination, a car truck having spaced apart axles supported by wheels adapted to run on track rails, connected side frames, bearing means carried by said axles and supporting said side frames, bolster support and guide means secured to the side frames, said bolster support and guide means including channel form guide portions extending below the side frames, a framework slidable vertically along said channel form guide portions, resilient means connecting said truck and framework whereby the latter is resiliently supported, rail contacting brake heads carried by said framework above the rails, said rail contacting brake heads being pivotally connected to said framework and automatically tiltable to conform to the rail head bevel, and stop means normally holding said rail contacting brake head substantially horizontal.

16. In combination, a car truck having wheels and axles in spaced relationship, connected side frames, control arms carried by said axles and supporting said side frames, a track brake unit carried by said control arms through the medium of semi-elliptic springs supported at their ends by said arms, and means for adjusting the characteristics of said springs.

17. In combination, a car truck having wheels and axles in spaced relationship, connected side frames, control arms carried by said axles and supporting said side frames, a track brake unit carried by said control arms through the medium of semi-elliptic springs supported at their ends by said arms, and means for adjusting the characteristics of said springs and the clearance between the unit and track.

ELMER LATSHAW.